US012745305B2

(12) United States Patent
Zhou et al.

(10) Patent No.: US 12,745,305 B2
(45) Date of Patent: Sep. 22, 2026

(54) ACTIVATING TRANSMISSION CONFIGURATION INDICATOR CODEPOINTS

(71) Applicant: QUALCOMM Incorporated, San Diego, CA (US)

(72) Inventors: Yan Zhou, San Diego, CA (US); Fang Yuan, Beijing (CN); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 18/550,623

(22) PCT Filed: May 5, 2021

(86) PCT No.: PCT/CN2021/091819

§ 371 (c)(1),
(2) Date: Sep. 14, 2023

(87) PCT Pub. No.: WO2022/232971

PCT Pub. Date: Nov. 10, 2022

(65) Prior Publication Data

US 2024/0251469 A1 Jul. 25, 2024

(51) Int. Cl.
*H04W 76/20* (2018.01)
*H04W 72/12* (2023.01)
(Continued)

(52) U.S. Cl.
CPC ........... *H04W 76/20* (2018.02); *H04W 72/12* (2013.01); *H04W 72/231* (2023.01); *H04W 80/02* (2013.01)

(58) Field of Classification Search
CPC ... H04W 76/20; H04W 72/12; H04W 72/231; H04W 80/02; H04L 5/0091; H04L 5/0053; H04L 5/0048
(Continued)

(56) References Cited

U.S. PATENT DOCUMENTS

2019/0253220 A1 8/2019 Kim
2020/0107352 A1* 4/2020 Tsai .................... H04B 7/0691
(Continued)

FOREIGN PATENT DOCUMENTS

CN 109587793 A 4/2019
CN 112087291 A 12/2020

OTHER PUBLICATIONS

ETRI: "Discussion on Beam Management in High Speed Train Scenario", 3GPP TSG RAN WG1 Meeting #92, R1-1802146, Athens, Greece, Feb. 26-Mar. 2, 2018, Mar. 2, 2018 (Mar. 2, 2018) Section 2, pp. 1-3.
(Continued)

*Primary Examiner* — Candal Elpenord
(74) *Attorney, Agent, or Firm* — Harrity & Harrity LLP

(57) ABSTRACT

Various aspects of the present disclosure generally relate to wireless communication. In some aspects, a user equipment (UE) may receive, from a base station, an indication that indicates whether a medium access control control element (MAC-CE)-based implicit transmission configuration indicator (TCI) update rule is enabled. The UE may receive, from the base station, a MAC-CE that activates one or more TCI codepoints based at least in part on the indication. Numerous other aspects are described.

23 Claims, 7 Drawing Sheets

(51) Int. Cl.
*H04W 72/231* (2023.01)
*H04W 80/02* (2009.01)

(58) Field of Classification Search
USPC .................................................. 370/329–330
See application file for complete search history.

(56) References Cited

U.S. PATENT DOCUMENTS

| | | | | |
|---|---|---|---|---|
| 2022/0046635 | A1* | 2/2022 | Liou | H04B 7/0691 |
| 2022/0077982 | A1* | 3/2022 | Zhang | H04L 5/0053 |
| 2023/0239125 | A1* | 7/2023 | Yi | H04B 7/06968<br>370/329 |
| 2023/0300835 | A1* | 9/2023 | Muruganathan | H04B 7/06968<br>370/329 |

OTHER PUBLICATIONS

International Search Report and Written Opinion—PCT/CN2021/091819—ISA/EPO—Jan. 26, 2022.

* cited by examiner

ACTIVATING TRANSMISSION CONFIGURATION INDICATOR CODEPOINTS

CROSS-REFERENCE TO RELATED APPLICATION

This Patent Application is a 371 national stage of PCT Application No. PCT/CN2021/091819 filed on May 5, 2021, entitled "ACTIVATING TRANSMISSION CONFIGURATION INDICATOR CODEPOINTS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for activating transmission configuration indicator (TCI) codepoints.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, coupled to the memory, configured to: receive, from a base station, an indication that indicates whether a medium access control control element (MAC-CE)-based implicit transmission configuration indicator (TCI) update rule is enabled; and receive, from the base station, a MAC-CE that activates one or more TCI codepoints based at least in part on the indication.

In some aspects, a base station for wireless communication includes a memory and one or more processors, coupled to the memory, configured to: transmit, to a UE, an indication that indicates whether a MAC-CE-based implicit TCI update rule is enabled; and transmit, to the UE, a MAC-CE that activates one or more TCI codepoints based at least in part on the indication.

In some aspects, a method of wireless communication performed by a UE includes receiving, from a base station, an indication that indicates whether a MAC-CE-based implicit TCI update rule is enabled; and receiving, from the base station, a MAC-CE that activates one or more TCI codepoints based at least in part on the indication.

In some aspects, a method of wireless communication performed by a base station includes transmitting, to a UE, an indication that indicates whether a MAC-CE-based implicit TCI update rule is enabled; and transmitting, to the UE, a MAC-CE that activates one or more TCI codepoints based at least in part on the indication.

In some aspects, a non-transitory computer-readable medium storing a set of instructions for wireless communication includes one or more instructions that, when executed by one or more processors of a UE, cause the UE to: receive, from a base station, an indication that indicates whether a MAC-CE-based implicit TCI update rule is enabled; and receive, from the base station, a MAC-CE that activates one or more TCI codepoints based at least in part on the indication.

In some aspects, a non-transitory computer-readable medium storing a set of instructions for wireless communication includes one or more instructions that, when executed by one or more processors of a base station, cause the base station to: transmit, to a UE, an indication that indicates whether a MAC-CE-based implicit TCI update rule is enabled; and transmit, to the UE, a MAC-CE that activates one or more TCI codepoints based at least in part on the indication.

In some aspects, an apparatus for wireless communication includes means for receiving, from a base station, an indication that indicates whether a MAC-CE-based implicit TCI update rule is enabled; and means for receiving, from the base station, a MAC-CE that activates one or more TCI codepoints based at least in part on the indication.

In some aspects, an apparatus for wireless communication includes means for transmitting, to a UE, an indication that indicates whether a MAC-CE-based implicit TCI update rule is enabled; and means for transmitting, to the UE, a MAC-CE that activates one or more TCI codepoints based at least in part on the indication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
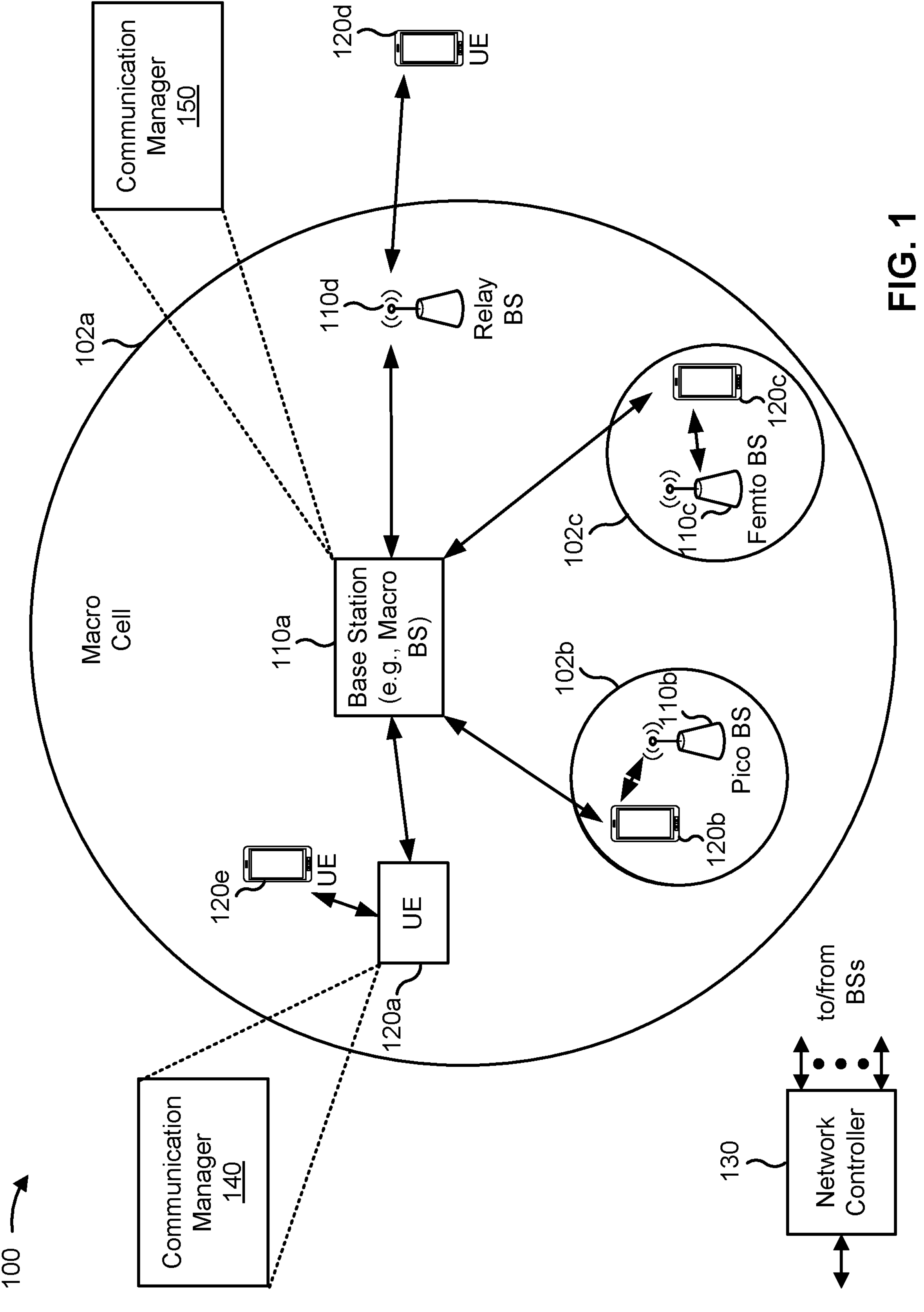
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IOT) devices, and/or may be implemented as NB-IOT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHZ, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHZ). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, a UE (e.g., UE 120) may include a communication manager 140. As described in more detail elsewhere herein, the communication manager 140 may receive, from a base station, an indication that indicates whether a MAC-CE-based implicit TCI update rule is enabled; and receive, from the base station, a MAC-CE that activates one or more TCI codepoints based at least in part on the indication. Additionally, or alternatively, the communication manager 140 may perform one or more other operations described herein.

In some aspects, a base station (e.g., base station 110) may include a communication manager 150. As described in more detail elsewhere herein, the communication manager 150 may transmit, to a UE, an indication that indicates whether a MAC-CE-based implicit TCI update rule is enabled; and transmit, to the UE, a MAC-CE that activates one or more TCI codepoints based at least in part on the indication. Additionally, or alternatively, the communication manager 150 may perform one or more other operations described herein.

As indicated above, FIG. 1 is provided as an example. Other examples may differ from what is described with regard to FIG. 1.

Figure 2:
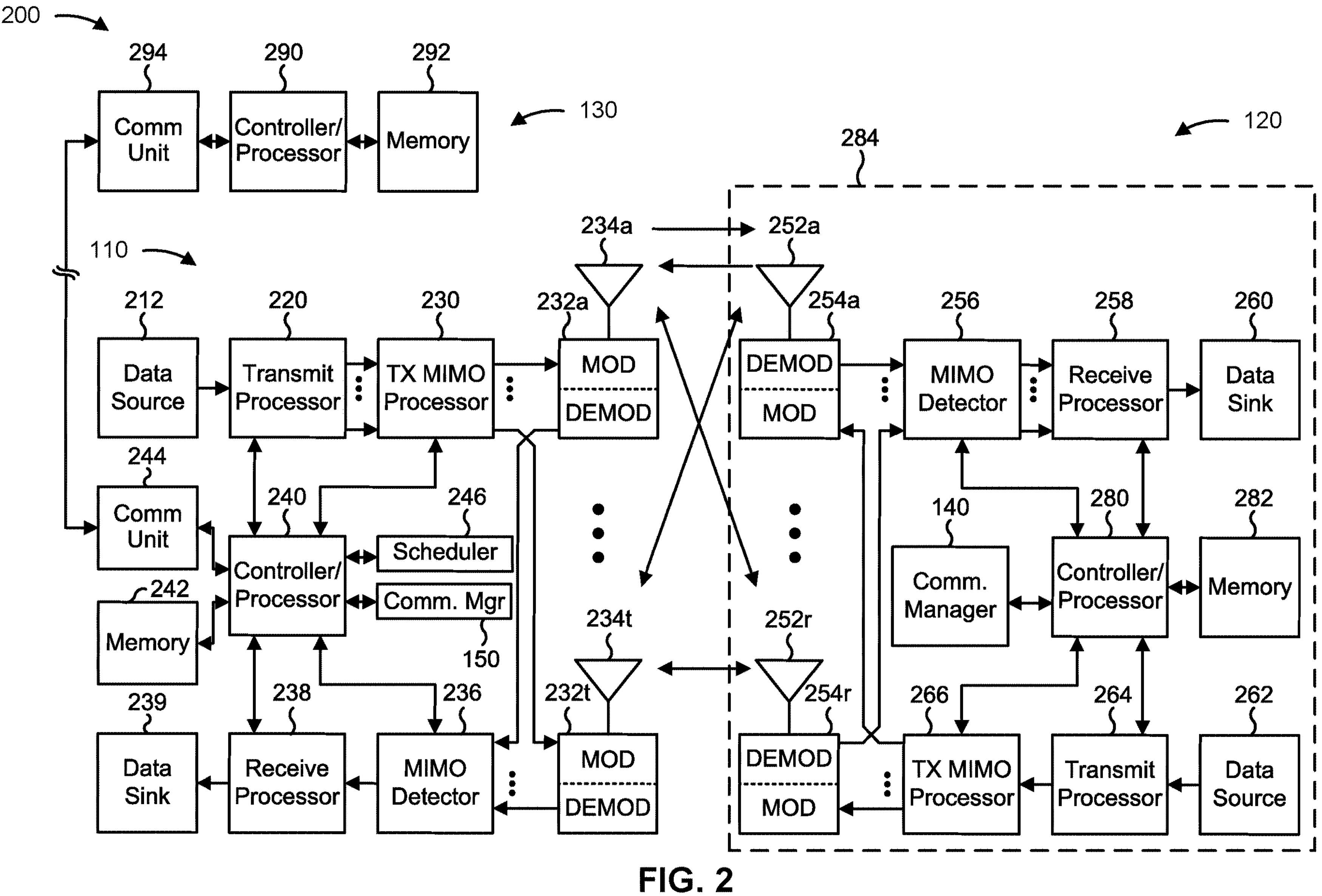
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-5).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-5).

Controller/processor 240 of base station 110, controller/processor 280 of UE 120, and/or any other component(s) of FIG. 2 may perform one or more techniques associated with activating TCI codepoints, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, a UE (e.g., UE 120) includes means for receiving, from a base station, an indication that indicates whether a MAC-CE-based implicit TCI update rule is enabled; and/or means for receiving, from the base station, a MAC-CE that activates one or more TCI codepoints based at least in part on the indication. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, a base station (e.g., base station 120) includes means for transmitting, to a UE, an indication that indicates whether a MAC-CE-based implicit TCI update rule is enabled; and/or means for transmitting, to the UE, a MAC-CE that activates one or more TCI codepoints based at least in part on the indication. The means for the base station to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A MAC-CE may activate one or more TCI codepoints. When more than one TCI codepoint is activated by the MAC-CE, activated TCI state(s) for a lowest TCI codepoint may be applied. In a MAC-CE based implicit TCI state update, a first activated TCI codepoint may be applied to a plurality of channels or reference signals (e.g., all channels or reference signals). The first activated TCI codepoint may be applied to the plurality of channels or reference signals to avoid transmitting an additional DCI for explicitly updating a TCI, and to avoid receiving a corresponding acknowledgement or negative acknowledgement for the DCI.

However, in some cases, using the MAC-CE based implicit TCI state update, in which the first TCI codepoint may be applied to the plurality of channels or reference signals, may be undesirable. For example, a base station may transmit DCI to originally select first and second TCI codepoints for a first common beam including a first control resource set (CORESET) and a second common beam including a second CORESET, respectively, for diversity purposes. At a later time, the base station may need to update a TCI state mapped to the second TCI codepoint. With the MAC-CE based implicit TCI state update, the plurality of channels or reference signals may be reset to the first activated TCI codepoint. With the MAC-CE based implicit TCI state update, to maintain two common beams, the base station may need to later transmit an additional DCI to select the second activated TCI codepoint for the second common beam. Without the MAC-CE based implicit TCI update (e.g., if using a MAC-CE based TCI activation), no additional DCI may be needed in this scenario.

In various aspects of techniques and apparatuses described herein, a UE may receive, from a base station, an indication that indicates whether a MAC-CE-based implicit TCI update rule is enabled. When the MAC-CE-based implicit TCI update rule is enabled, the UE may receive a MAC-CE that activates one or more TCI codepoints based at least in part on the MAC-CE-based implicit TCI update rule. When the MAC-CE-based implicit TCI update rule is not enabled, the UE may receive a MAC-CE that activates one or more TCI codepoints based at least in part on a MAC-CE based TCI activation rule, and at least one pre-determined activated TCI codepoint may be applied to at least one pre-determined set of physical channels or reference signals. The base station may indicate that the UE is to apply the MAC-CE-based implicit TCI update rule or the MAC-CE based TCI activation rule, depending on a current scenario. As a result, the UE may not apply the MAC-CEbased implicit TCI update rule when applying the MAC-CE based TCI activation rule is more desirable to reduce signaling, or vice versa.

Figure 3:
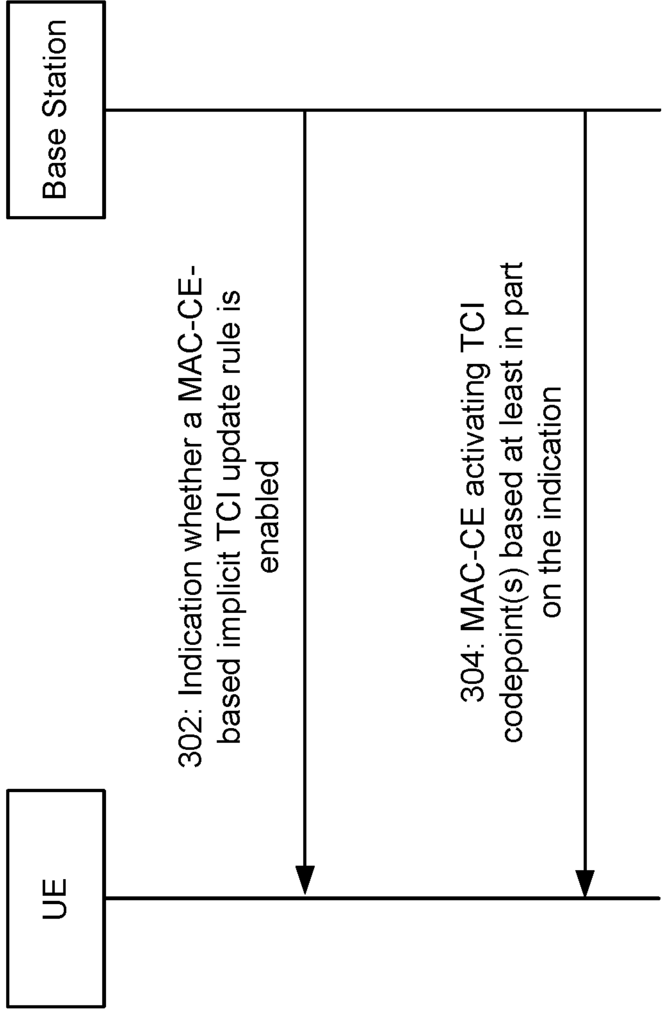
FIG. 3 is a diagram illustrating an example associated with activating TCI codepoints, in accordance with the present disclosure.

FIG. 3 is a diagram illustrating an example 300 of activating TCI codepoints, in accordance with the present disclosure. As shown in FIG. 3, example 300 includes communication between a UE (e.g., UE 120) and a base station (e.g., base station 110). In some aspects, the UE and the base station may be included in a wireless network, such as wireless network 100.

As shown by reference number 302, the UE may receive, from the base station, an indication that indicates whether a MAC-CE-based implicit TCI update rule is enabled. In some aspects, a MAC-CE that activates one or more TCI codepoints may be based at least in part on the MAC-CE based implicit TCI update rule when the indication indicates that the MAC-CE based implicit TCI update rule is enabled. In some aspects, one or more predetermined activated TCI codepoints may be applied to one or more predetermined sets of channels or reference signals when the MAC-CE based implicit TCI update rule is enabled. In some aspects, the MAC-CE based implicit TCI update rule may be associated with applying a first activated TCI codepoint to a plurality of channels or reference signals to prevent a transmission of additional downlink control information for TCI indication.

In some aspects, a MAC-CE that activates one or more TCI codepoints may be based at least in part on a MAC-CE based TCI activation rule when the indication indicates that the MAC-CE based implicit TCI update rule is not enabled. The MAC-CE based TCI activation rule may be associated with applying a TCI state to a set of channels or reference signals associated with a TCI codepoint, after a MAC-CE activation time, when a MAC-CE activates the TCI codepoint mapped to the TCI state In some aspects, the base station may transmit, to the UE, an indication to indicate whether a MAC-CE based implicit TCI update is enabled. When the MAC-CE based implicit TCI update is not enabled, a MAC-CE based TCI activation rule may be applied. For example, the base station may transmit, to the UE, DCI to initially select an X-th TCI codepoint mapped to a first TCI state for a set of channels or reference signals. The base station may later transmit, to the UE, a MAC-CE to activate the X-th TCI codepoint mapped to a second TCI state (X=0, 1, 2 . . . ). The second TCI state may be automatically applied to the set of channels or reference signals with the X-th TCI codepoint after a MAC-CE activation time. The second TCI state may be applied to corresponding channels or reference signals without requiring a further DCI indication.

In some aspects, when the MAC-CE based implicit TCI update is enabled, a MAC-CE based implicit TCI update rule may be applied. With the MAC-CE based implicit TCI update rule, at least one predetermined activated TCI codepoint may be applied to at least one predetermined set of channels or reference signals. For example, a first activated TCI codepoint may be applied to a plurality of channels or reference signals.

In some aspects, the indicator may inform the UE of whether to treat TCI codepoint(s) activated by the MAC-CE based at least in part on the MAC-CE based TCI activation rule or the MAC-CE based implicit TCI update rule. In some aspects, the base station may transmit the indication via a radio resource control (RRC) flag. In some aspects, the base station may transmit the indication via an indicator (e.g., one bit) in a MAC-CE, which may be a same MAC-CE that is used for TCI activation. In some aspects, the base station may transmit the indication via an indicator (e.g., one bit) in a DCI. The DCI may be for a TCI update with or without a scheduled downlink/uplink transmission. Alternatively, the DCI may not be for a TCI update (e.g., a DCI for scheduling a downlink/uplink transmission).

In some aspects, the MAC-CE based implicit TCI update rule may be based at least in part on a first variant, a second variant, a third variant, or a fourth variant.

In the first variant of the MAC-CE based implicit TCI update rule, one predetermined activated TCI codepoint may be applied to a plurality of channels or reference signals (e.g., all channels or reference signals). For example, a predetermined activated TCI codepoint may be a first activated TCI codepoint.

In the second variant of the MAC-CE based implicit TCI update rule, multiple predetermined activated TCI codepoints may be applied to multiple predetermined sets of channels or reference signals, respectively. As an example, first and second activated TCI codepoints may be applied to a first CORESET and a second CORESET, respectively. As another example, first and second activated TCI codepoints may be applied to channels and/or reference signals scheduled/activated by a first TRP (TRP #0) and a second TRP (TRP #1), as indicated by a first CORESET pool index and a second CORESET pool index, respectively. As yet another example, a first TCI codepoint mapped to a separate downlink common TCI state may be applied to a plurality of downlink channels or reference signals, while a first TCI codepoint mapped to a separate uplink common TCI state may be applied to all of a plurality of uplink channels or reference signals.

In the third variant of the MAC-CE based implicit TCI update rule, multiple TCI states mapped to a predetermined activated TCI codepoint may be applied to multiple predetermined sets of channels or reference signals, respectively. For example, first and second TCI states mapped to a first activated TCI codepoint with two TCI states may be applied to a first CORESET and a second CORESET, respectively.

In the fourth variant of the MAC-CE based implicit TCI update rule, multiple TCI states mapped to a predetermined activated TCI codepoint may be applied to multiple TCI states originally configured/indicated to a channel or reference signal, respectively. For example, first and second TCI states mapped to a first activated TCI codepoint with two TCI states may be applied to a plurality of CORESETs (e.g., all CORESETs) or a particular CORESET (e.g., a first CORESET) originally configured with two TCI states. In other words, the first and second TCI states mapped to the first activated TCI codepoint may replace the two originally configured TCI states, respectively.

In some aspects, the base station may transmit an indication to indicate whether the UE is to use the MAC-CE based TCI activation rule or the MAC-CE based implicit TCI update rule. When the indication indicates that the UE is to use the MAC-CE based implicit TCI update rule, the indication may specify one of the variants (e.g., the first variant, the second variant, the third variant, or the fourth variant) of the MAC-CE based implicit TCI update rule for the UE to use. In some aspects, the base station may signal the indication to the UE via RRC signaling, a MAC-CE, or DCI. When the indication is signaled in a MAC-CE, the indication may be signaled via a same MAC-CE that is activating TCI codepoint(s).

In some aspects, for the one or more variants of the MAC-CE based implicit TCI update rule, a predetermined codepoint may be determined (and in some cases, restricted to be determined) within TCI codepoints mapped to a particular quantity of TCI states. For example, for the first and second variants of the MAC-CE based implicit TCI update rule, first and second activated TCI codepoints may be determined within TCI codepoints mapped to a single TCI state. As another example, for the third variant of the MAC-CE based implicit TCI update rule, a first TCI codepoint may be determined within TCI codepoints mapped to two states.

In some aspects, for the one or more variants of the MAC-CE based implicit TCI update rule, a predetermined codepoint may be mapped (and in some cases, restricted to be mapped) to a particular quantity of TCI states. For example, for the first and second variants of the MAC-CE based implicit TCI update rule, first and second activated TCI codepoints may be mapped to a single TCI state. As another example, for the third variant of the MAC-CE based implicit TCI update rule, a first TCI codepoint may be mapped to two states.

In some aspects, for the one or more variants of the MAC-CE based implicit TCI update rule, applied channels or reference signals may include a physical downlink control channel (PDCCH), physical downlink shared channel (PDSCH), channel state information reference signal (CSI-RS), physical uplink control channel (PUCCH), physical uplink shared channel (PUSCH), and/or sounding reference signal (SRS). For a given channel or reference signal type, an applicable channel or reference signal type may be further restricted to those originally configured/indicated with a particular quantity of TCI states. For example, for the first and second variants of the MAC-CE based implicit TCI update rule, in the case of CORESETs, first and second activated TCI codepoints may only be applied to CORESETs originally configured with a single TCI state. As another example, for the third variant of the MAC-CE based implicit TCI update rule, in the case of CORESETs, first and second TCI states mapped to a first activated TCI codepoint may only be applied to CORESETs originally configured with two TCI states.

In some aspects, for the one or more variants of the MAC-CE based implicit TCI update rule, activated TCI states may include a joint downlink/uplink TCI state, a separate downlink common TCI state, a separate uplink common TCI state, a legacy single-channel downlink TCI state, and/or a legacy single-channel uplink spatial relation.

In some aspects, applied TCI state(s) based at least in part on the MAC-CE based implicit TCI update rule may or may not be overwritten by TCI state(s) later selected by a TCI-updating DCI. For example, a MAC-CE based implicit TCI update rule may or may not be simultaneously enabled with a DCI based TCI update.

As shown by reference number 304, the UE may receive, from the base station, the MAC-CE that activates one or more TCI codepoints based at least in part on the indication. In some aspects, the UE may interpret the MAC-CE that activates one or more TCI codepoints based at least in part on the MAC-CE-based implicit TCI update rule, based at least in part on the indication received from the base station. In some aspects, the UE may interpret the MAC-CE that activates one or more TCI codepoints based at least in part on the MAC-CE based TCI activation rule, based at least in part on the indication received from the base station.

As indicated above, FIG. 3 is provided as an example. Other examples may differ from what is described with regard to FIG. 3.

Figure 4:
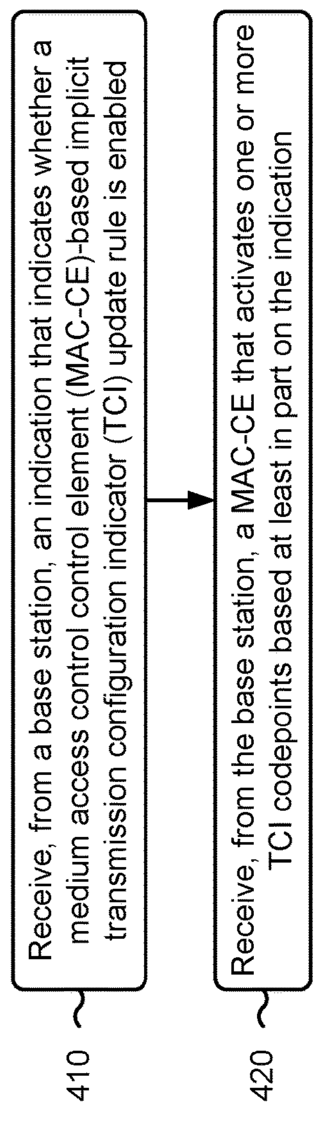
FIGS. 4-5 are diagrams illustrating example processes associated with activating TCI codepoints, in accordance with the present disclosure.

FIG. 4 is a diagram illustrating an example process 400 performed, for example, by a UE, in accordance with the present disclosure. Example process 400 is an example where the UE (e.g., UE 120) performs operations associated with activating TCI codepoints.

As shown in FIG. 4, in some aspects, process 400 may include receiving, from a base station, an indication that indicates whether a MAC-CE-based implicit TCI update rule is enabled (block 410). For example, the UE (e.g., using communication manager 140 and/or reception component 602, depicted in FIG. 6) may receive, from a base station, an indication that indicates whether a MAC-CE-based implicit TCI update rule is enabled, as described above.

As further shown in FIG. 4, in some aspects, process 400 may include receiving, from the base station, a MAC-CE that activates one or more TCI codepoints based at least in part on the indication (block 420). For example, the UE (e.g., using communication manager 140 and/or reception component 602, depicted in FIG. 6) may receive, from the base station, a MAC-CE that activates one or more TCI codepoints based at least in part on the indication, as described above.

Process 400 may include additional aspects, such as any single aspect or any combination of aspects described below and/or in connection with one or more other processes described elsewhere herein.

In a first aspect, the MAC-CE that activates the one or more TCI codepoints is based at least in part on the MAC-CE based implicit TCI update rule when the indication indicates that the MAC-CE based implicit TCI update rule is enabled.

In a second aspect, alone or in combination with the first aspect, the MAC-CE that activates the one or more TCI codepoints is based at least in part on a MAC-CE based TCI activation rule when the indication indicates that the MAC-CE based implicit TCI update rule is not enabled.

In a third aspect, alone or in combination with one or more of the first and second aspects, the MAC-CE based TCI activation rule is associated with applying a TCI state to a set of channels or reference signals associated with a TCI codepoint, after a MAC-CE activation time, when a MAC-CE activates the TCI codepoint mapped to the TCI state.

In a fourth aspect, alone or in combination with one or more of the first through third aspects, one or more predetermined activated TCI codepoints are applied to one or more predetermined sets of channels or reference signals when the MAC-CE based implicit TCI update rule is enabled.

In a fifth aspect, alone or in combination with one or more of the first through fourth aspects, the MAC-CE based implicit TCI update rule is associated with applying a first activated TCI codepoint to a plurality of channels or reference signals to prevent a transmission of additional DCI.

In a sixth aspect, alone or in combination with one or more of the first through fifth aspects, receiving the indication comprises receiving the indication via an RRC flag.

In a seventh aspect, alone or in combination with one or more of the first through sixth aspects, receiving the indication comprises receiving the indication via an indicator in a MAC-CE that is used for TCI activation.

In an eighth aspect, alone or in combination with one or more of the first through seventh aspects, receiving the indication comprises receiving the indication via an indicator in DCI, wherein the DCI is associated with a TCI update that includes or does not include a downlink/uplink transmission, or wherein the DCI is not associated with the TCI update and is used for scheduling the downlink/uplink transmission.

In a ninth aspect, alone or in combination with one or more of the first through eighth aspects, the MAC-CE based implicit TCI update rule is associated with applying one predetermined activated TCI codepoint to a plurality of channels or reference signals.

In a tenth aspect, alone or in combination with one or more of the first through ninth aspects, the MAC-CE based implicit TCI update rule is associated with applying multiple predetermined activated TCI codepoints to multiple predetermined sets of channels or reference signals.

In an eleventh aspect, alone or in combination with one or more of the first through tenth aspects, the MAC-CE based implicit TCI update rule is associated with applying multiple TCI states mapped to a predetermined activated TCI codepoint to multiple predetermined sets of channels or reference signals.

In a twelfth aspect, alone or in combination with one or more of the first through eleventh aspects, the MAC-CE based implicit TCI update rule is associated with applying multiple TCI states mapped to a predetermined activated TCI codepoint to multiple TCI states originally configured or indicated for a channel or reference signal.

In a thirteenth aspect, alone or in combination with one or more of the first through twelfth aspects, the indication instructs the UE to use the MAC-CE based implicit TCI update rule or a MAC-CE based TCI activation rule, and the indication is signaled via RRC signaling, a MAC-CE, or DCI.

In a fourteenth aspect, alone or in combination with one or more of the first through thirteenth aspects, one or more predetermined activated TCI codepoints associated with the MAC-CE based implicit TCI update rule are determined based at least in part on TCI codepoints mapped to a quantity of TCI states.

In a fifteenth aspect, alone or in combination with one or more of the first through fourteenth aspects, one or more predetermined activated TCI codepoints associated with the MAC-CE based implicit TCI update rule are mapped to a quantity of TCI states.

In a sixteenth aspect, alone or in combination with one or more of the first through fifteenth aspects, an applied channel or reference signal associated with the MAC-CE based implicit TCI update rule includes one or more of a PDCCH, a PDSCH, a CSI-RS, a PUCCH, a PUSCH, or an SRS, and the applied channel or reference signal is based at least in part on originally configured or indicated channels or reference signals with a quantity of TCI states.

In a seventeenth aspect, alone or in combination with one or more of the first through sixteenth aspects, an activated TCI state associated with the MAC-CE based implicit TCI update rule includes one or more of a joint downlink/uplink TCI state, a separate downlink common TCI state, a separate uplink common TCI state, a legacy single-channel downlink TCI state, or a legacy single-channel uplink spatial relation.

In an eighteenth aspect, alone or in combination with one or more of the first through seventeenth aspects, one or more applied TCI states according to the MAC-CE based implicit TCI update rule are overwritten by one or more TCI states later selected by a TCI-updating DCI.

In a nineteenth aspect, alone or in combination with one or more of the first through eighteenth aspects, one or more applied TCI states according to the MAC-CE based implicit TCI update rule cannot be overwritten by one or more TCI states later selected by a TCI-updating DCI.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
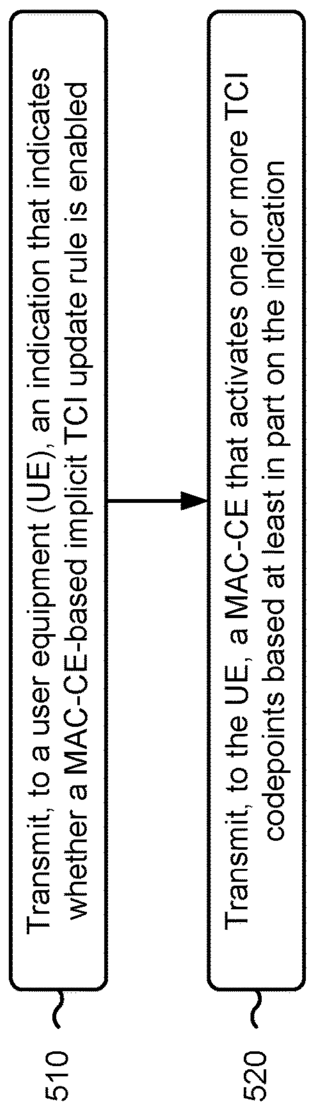

FIG. 5 is a diagram illustrating an example process 500 performed, for example, by a base station, in accordance with the present disclosure. Example process 500 is an example where the base station (e.g., base station 110) performs operations associated with activating TCI codepoints.

As shown in FIG. 5, in some aspects, process 500 may include transmitting, to a UE, an indication that indicates whether a MAC-CE-based implicit TCI update rule is enabled (block 510). For example, the base station (e.g., using communication manager 150 and/or transmission component 704, depicted in FIG. 7) may transmit, to a UE, an indication that indicates whether a MAC-CE-based implicit TCI update rule is enabled, as described above.

As further shown in FIG. 5, in some aspects, process 500 may include transmitting, to the UE, a MAC-CE that activates one or more TCI codepoints based at least in part on the indication (block 520). For example, the base station (e.g., using communication manager 150 and/or transmission component 704, depicted in FIG. 7) may transmit, to the UE, a MAC-CE that activates one or more TCI codepoints based at least in part on the indication, as described above.

Process 500 may include additional aspects, such as any single aspect or any combination of aspects described below and/or in connection with one or more other processes described elsewhere herein.

In a first aspect, the MAC-CE that activates the one or more TCI codepoints is based at least in part on the MAC-CE based implicit TCI update rule when the indication indicates that the MAC-CE based implicit TCI update rule is enabled.

In a second aspect, alone or in combination with the first aspect, the MAC-CE that activates the one or more TCI codepoints is based at least in part on a MAC-CE based TCI activation rule when the indication indicates that the MAC-CE based implicit TCI update rule is not enabled.

In a third aspect, alone or in combination with one or more of the first and second aspects, the MAC-CE based TCI activation rule is associated with applying a TCI state to a set of channels or reference signals associated with a TCI codepoint, after a MAC-CE activation time, when a MAC-CE activates the TCI codepoint mapped to the TCI state.

In a fourth aspect, alone or in combination with one or more of the first through third aspects, one or more predetermined activated TCI codepoints are applied to one or more predetermined sets of channels or reference signals when the MAC-CE based implicit TCI update rule is enabled.

In a fifth aspect, alone or in combination with one or more of the first through fourth aspects, the MAC-CE based implicit TCI update rule is associated with applying a first activated TCI codepoint to a plurality of channels or reference signals to prevent a transmission of additional DCI.

In a sixth aspect, alone or in combination with one or more of the first through fifth aspects, transmitting the indication comprises transmitting the indication via an RRC flag.

In a seventh aspect, alone or in combination with one or more of the first through sixth aspects, transmitting the indication comprises transmitting the indication via an indicator in a MAC-CE that is used for TCI activation.

In an eighth aspect, alone or in combination with one or more of the first through seventh aspects, transmitting the indication comprises transmitting the indication via an indicator in DCI, wherein the DCI is associated with a TCI update that includes or does not include a downlink/uplink transmission, or wherein the DCI is not associated with the TCI update and is used for scheduling the downlink/uplink transmission.

In a ninth aspect, alone or in combination with one or more of the first through eighth aspects, the MAC-CE based implicit TCI update rule is associated with applying one predetermined activated TCI codepoint to a plurality of channels or reference signals.

In a tenth aspect, alone or in combination with one or more of the first through ninth aspects, the MAC-CE based implicit TCI update rule is associated with applying multiple predetermined activated TCI codepoints to multiple predetermined sets of channels or reference signals.

In an eleventh aspect, alone or in combination with one or more of the first through tenth aspects, the MAC-CE based implicit TCI update rule is associated with applying multiple TCI states mapped to a predetermined activated TCI codepoint to multiple predetermined sets of channels or reference signals.

In a twelfth aspect, alone or in combination with one or more of the first through eleventh aspects, the MAC-CE based implicit TCI update rule is associated with applying multiple TCI states mapped to a predetermined activated TCI codepoint to multiple TCI states originally configured or indicated for a channel or reference signal.

In a thirteenth aspect, alone or in combination with one or more of the first through twelfth aspects, the indication instructs the UE to use the MAC-CE based implicit TCI update rule or a MAC-CE based TCI activation rule, and the indication is signaled via RRC signaling, a MAC-CE, or DCI.

In a fourteenth aspect, alone or in combination with one or more of the first through thirteenth aspects, one or more predetermined activated TCI codepoints associated with the MAC-CE based implicit TCI update rule are determined based at least in part on TCI codepoints mapped to a quantity of TCI states.

In a fifteenth aspect, alone or in combination with one or more of the first through fourteenth aspects, one or more predetermined activated TCI codepoints associated with the MAC-CE based implicit TCI update rule are mapped to a quantity of TCI states.

In a sixteenth aspect, alone or in combination with one or more of the first through fifteenth aspects, an applied channel or reference signal associated with the MAC-CE based implicit TCI update rule includes one or more of a PDCCH, a PDSCH, a CSI-RS, a PUCCH, a PUSCH, or an SRS, and the applied channel or reference signal is based at least in part on originally configured or indicated channels or reference signals with a quantity of TCI states.

In a seventeenth aspect, alone or in combination with one or more of the first through sixteenth aspects, an activated TCI state associated with the MAC-CE based implicit TCI update rule includes one or more of a joint downlink/uplink TCI state, a separate downlink common TCI state, a separate uplink common TCI state, a legacy single-channel downlink TCI state, or a legacy single-channel uplink spatial relation.

In an eighteenth aspect, alone or in combination with one or more of the first through seventeenth aspects, one or more applied TCI states according to the MAC-CE based implicit TCI update rule are overwritten by one or more TCI states later selected by a TCI-updating DCI.

In a nineteenth aspect, alone or in combination with one or more of the first through eighteenth aspects, one or more applied TCI states according to the MAC-CE based implicit TCI update rule cannot be overwritten by one or more TCI states later selected by a TCI-updating DCI.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
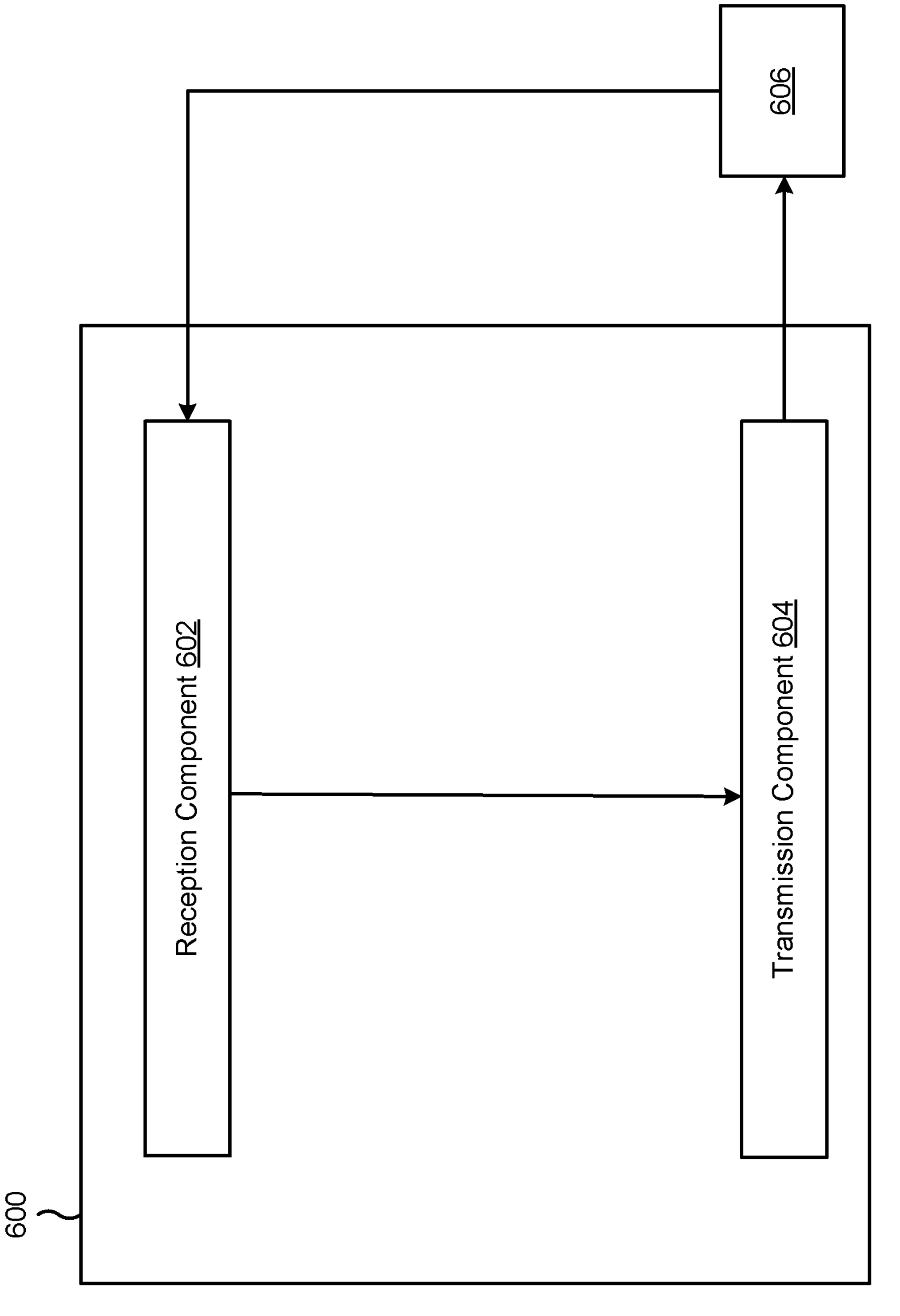
FIGS. 6-7 are block diagrams of example apparatuses for wireless communication, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604.

In some aspects, the apparatus 600 may be configured to perform one or more operations described herein in connection with FIG. 3. Additionally, or alternatively, the apparatus 600 may be configured to perform one or more processes described herein, such as process 400 of FIG. 4. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The reception component 602 may receive, from a base station, an indication that indicates whether a MAC-CE-based implicit TCI update rule is enabled. The reception component 602 may receive, from the base station, a MAC-CE that activates one or more TCI codepoints based at least in part on the indication.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
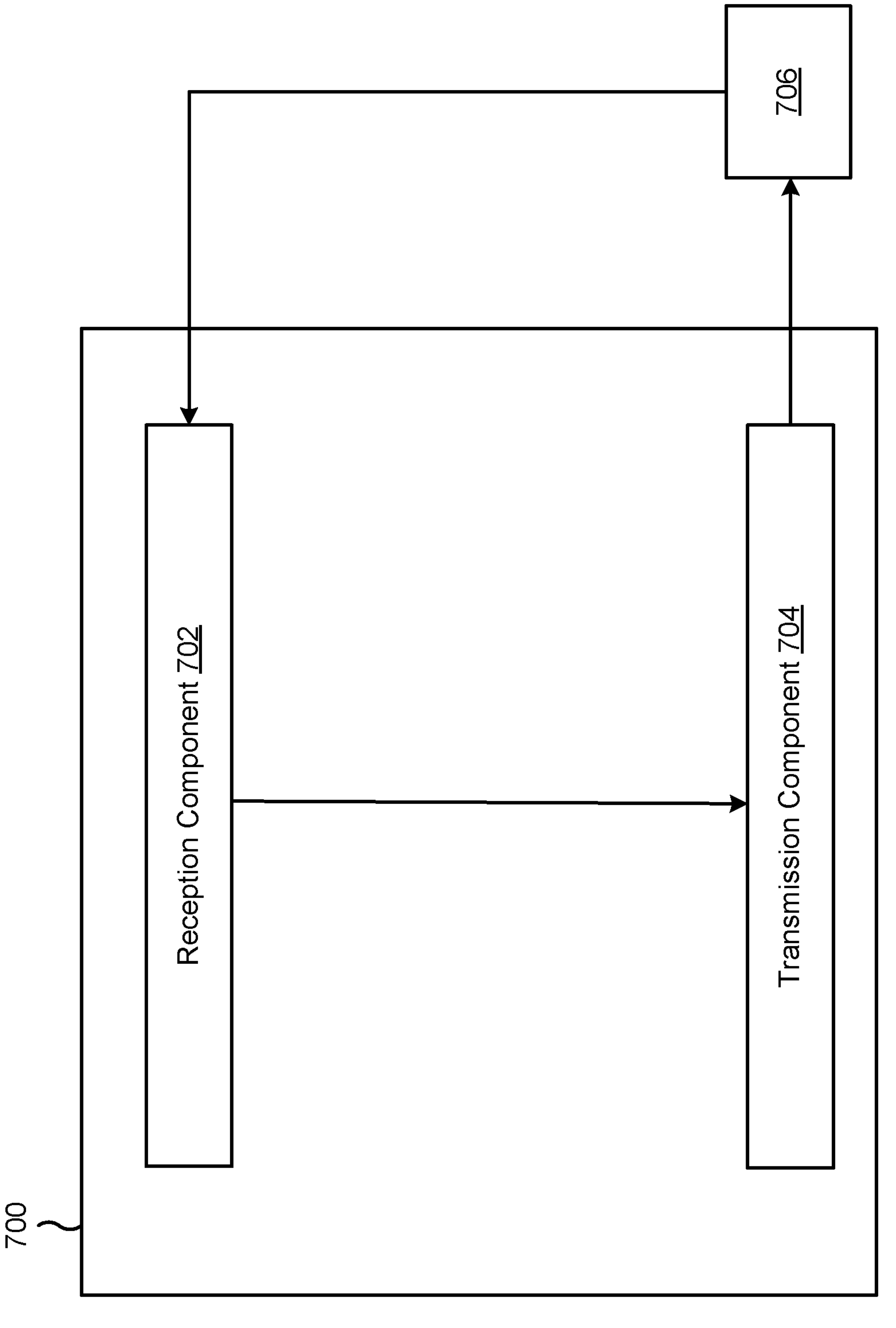

FIG. 7 is a block diagram of an example apparatus 700 for wireless communication. The apparatus 700 may be a base station, or a base station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704.

In some aspects, the apparatus 700 may be configured to perform one or more operations described herein in connection with FIG. 3. Additionally, or alternatively, the apparatus 700 may be configured to perform one or more processes described herein, such as process 500 of FIG. 5. In some aspects, the apparatus 700 and/or one or more components shown in FIG. 7 may include one or more components of the base station described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the base station described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the base station described above in connection with FIG. 2. In some aspects, the transmission component 704 may be co-located with the reception component 702 in a transceiver.

The transmission component 704 may transmit, to a UE, an indication that indicates whether a MAC-CE-based implicit TCI update rule is enabled. The transmission component 704 may transmit, to the UE, a MAC-CE that activates one or more TCI codepoints based at least in part on the indication.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: receiving, from a base station, an indication that indicates whether a medium access control control element (MAC-CE)-based implicit transmission configuration indicator (TCI) update rule is enabled; and receiving, from the base station, a MAC-CE that activates one or more TCI codepoints based at least in part on the indication.

Aspect 2: The method of Aspect 1, wherein the MAC-CE that activates the one or more TCI codepoints is based at least in part on the MAC-CE based implicit TCI update rule when the indication indicates that the MAC-CE based implicit TCI update rule is enabled.

Aspect 3: The method of any of Aspects 1 through 2, wherein the MAC-CE that activates the one or more TCI codepoints is based at least in part on a MAC-CE based TCI activation rule when the indication indicates that the MAC-CE based implicit TCI update rule is not enabled.

Aspect 4: The method of Aspect 3, wherein the MAC-CE based TCI activation rule is associated with applying a TCI state to a set of channels or reference signals associated with a TCI codepoint, after a MAC-CE activation time, when a MAC-CE activates the TCI codepoint mapped to the TCI state.

Aspect 5: The method of any of Aspects 1 through 4, wherein one or more predetermined activated TCI codepoints are applied to one or more predetermined sets of channels or reference signals when the MAC-CE based implicit TCI update rule is enabled.

Aspect 6: The method of any of Aspects 1 through 5, wherein the MAC-CE based implicit TCI update rule is associated with applying a first activated TCI codepoint to a plurality of channels or reference signals to prevent a transmission of additional downlink control information.

Aspect 7: The method of any of Aspects 1 through 6, wherein receiving the indication comprises receiving the indication via a radio resource control flag.

Aspect 8: The method of any of Aspects 1 through 7, wherein receiving the indication comprises receiving the indication via an indicator in a MAC-CE that is used for TCI activation.

Aspect 9: The method of any of Aspects 1 through 8, wherein receiving the indication comprises receiving the indication via an indicator in downlink control information (DCI), wherein the DCI is associated with a TCI update that includes or does not include a downlink/uplink transmission, or wherein the DCI is not associated with the TCI update and is used for scheduling the downlink/uplink transmission.

Aspect 10: The method of any of Aspects 1 through 9, wherein the MAC-CE based implicit TCI update rule is associated with applying one predetermined activated TCI codepoint to a plurality of channels or reference signals.

Aspect 11: The method of any of Aspects 1 through 10, wherein the MAC-CE based implicit TCI update rule is associated with applying multiple predetermined activated TCI codepoints to multiple predetermined sets of channels or reference signals.

Aspect 12: The method of any of Aspects 1 through 11, wherein the MAC-CE based implicit TCI update rule is associated with applying multiple TCI states mapped to a predetermined activated TCI codepoint to multiple predetermined sets of channels or reference signals.

Aspect 13: The method of any of Aspects 1 through 12, wherein the MAC-CE based implicit TCI update rule is associated with applying multiple TCI states mapped to a predetermined activated TCI codepoint to multiple TCI states originally configured or indicated for a channel or reference signal.

Aspect 14: The method of any of Aspects 1 through 13, wherein the indication instructs the UE to use the MAC-CE based implicit TCI update rule or a MAC-CE based TCI activation rule, and wherein the indication is signaled via radio resource control signaling, a MAC-CE, or downlink control information.

Aspect 15: The method of any of Aspects 1 through 14, wherein one or more predetermined activated TCI codepoints associated with the MAC-CE based implicit TCI update rule are determined based at least in part on TCI codepoints mapped to a quantity of TCI states.

Aspect 16: The method of any of Aspects 1 through 15, wherein one or more predetermined activated TCI codepoints associated with the MAC-CE based implicit TCI update rule are mapped to a quantity of TCI states.

Aspect 17: The method of any of Aspects 1 through 16, wherein an applied channel or reference signal associated with the MAC-CE based implicit TCI update rule includes one or more of a physical downlink control channel, a physical downlink shared channel, a channel state information reference signal, a physical uplink control channel, a physical uplink shared channel, or a sounding reference signal, and wherein the applied channel or reference signal is based at least in part on originally configured or indicated channels or reference signals with a quantity of TCI states.

Aspect 18: The method of any of Aspects 1 through 17, wherein an activated TCI state associated with the MAC-CE based implicit TCI update rule includes one or more of a joint downlink/uplink TCI state, a separate downlink common TCI state, a separate uplink common TCI state, a legacy single-channel downlink TCI state, or a legacy single-channel uplink spatial relation.

Aspect 19: The method of any of Aspects 1 through 18, wherein one or more applied TCI states according to the MAC-CE based implicit TCI update rule are overwritten by one or more TCI states later selected by a TCI-updating downlink control information.

Aspect 20: The method of any of Aspects 1 through 19, wherein one or more applied TCI states according to the MAC-CE based implicit TCI update rule cannot be overwritten by one or more TCI states later selected by a TCI-updating downlink control information.

Aspect 21: A method of wireless communication performed by a base station, comprising: transmitting, to a user equipment (UE), an indication that indicates whether a medium access control control element (MAC-CE)-based implicit transmission configuration indicator (TCI) update rule is enabled; and transmitting, to the UE, a MAC-CE that activates one or more TCI codepoints based at least in part on the indication.

Aspect 22: The method of Aspect 21, wherein the MAC-CE that activates the one or more TCI codepoints is based at least in part on the MAC-CE based implicit TCI update rule when the indication indicates that the MAC-CE based implicit TCI update rule is enabled.

Aspect 23: The method of any of Aspects 21 through 22, wherein the MAC-CE that activates the one or more TCI codepoints is based at least in part on a MAC-CE based TCI activation rule when the indication indicates that the MAC-CE based implicit TCI update rule is not enabled.

Aspect 24: The method of Aspect 23, wherein the MAC-CE based TCI activation rule is associated with applying a TCI state to a set of channels or reference signals associated with a TCI codepoint, after a MAC-CE activation time, when a MAC-CE activates the TCI codepoint mapped to the TCI state.

Aspect 25: The method of any of Aspects 21 through 24, wherein one or more predetermined activated TCI codepoints are applied to one or more predetermined sets of channels or reference signals when the MAC-CE based implicit TCI update rule is enabled.

Aspect 26: The method of any of Aspects 21 through 25, wherein the MAC-CE based implicit TCI update rule is associated with applying a first activated TCI codepoint to a plurality of channels or reference signals to prevent a transmission of additional downlink control information.

Aspect 27: The method of any of Aspects 21 through 26, wherein transmitting the indication comprises transmitting the indication via a radio resource control flag.

Aspect 28: The method of any of Aspects 21 through 27, wherein transmitting the indication comprises transmitting the indication via an indicator in a MAC-CE that is used for TCI activation.

Aspect 29: The method of any of Aspects 21 through 28, wherein transmitting the indication comprises transmitting the indication via an indicator in downlink control information (DCI), wherein the DCI is associated with a TCI update that includes or does not include a downlink/uplink transmission, or wherein the DCI is not associated with the TCI update and is used for scheduling the downlink/uplink transmission.

Aspect 30: The method of any of Aspects 21 through 29, wherein the MAC-CE based implicit TCI update rule is associated with applying one predetermined activated TCI codepoint to a plurality of channels or reference signals.

Aspect 31: The method of any of Aspects 21 through 30, wherein the MAC-CE based implicit TCI update rule is associated with applying multiple predetermined activated TCI codepoints to multiple predetermined sets of channels or reference signals.

Aspect 32: The method of any of Aspects 21 through 31, wherein the MAC-CE based implicit TCI update rule is associated with applying multiple TCI states mapped to a predetermined activated TCI codepoint to multiple predetermined sets of channels or reference signals.

Aspect 33: The method of any of Aspects 21 through 32, wherein the MAC-CE based implicit TCI update rule is associated with applying multiple TCI states mapped to a predetermined activated TCI codepoint to multiple TCI states originally configured or indicated for a channel or reference signal.

Aspect 34: The method of any of Aspects 21 through 33, wherein the indication instructs the UE to use the MAC-CE based implicit TCI update rule or a MAC-CE based TCI activation rule, and wherein the indication is signaled via radio resource control signaling, a MAC-CE, or downlink control information.

Aspect 35: The method of any of Aspects 21 through 34, wherein one or more predetermined activated TCI codepoints associated with the MAC-CE based implicit TCI update rule are determined based at least in part on TCI codepoints mapped to a quantity of TCI states.

Aspect 36: The method of any of Aspects 21 through 35, wherein one or more predetermined activated TCI codepoints associated with the MAC-CE based implicit TCI update rule are mapped to a quantity of TCI states.

Aspect 37: The method of any of Aspects 21 through 36, wherein an applied channel or reference signal associated with the MAC-CE based implicit TCI update rule includes one or more of a physical downlink control channel, a physical downlink shared channel, a channel state information reference signal, a physical uplink control channel, a physical uplink shared channel, or a sounding reference signal, and wherein the applied channel or reference signal is based at least in part on originally configured or indicated channels or reference signals with a quantity of TCI states.

Aspect 38: The method of any of Aspects 21 through 37, wherein an activated TCI state associated with the MAC-CE based implicit TCI update rule includes one or more of a joint downlink/uplink TCI state, a separate downlink common TCI state, a separate uplink common TCI state, a legacy single-channel downlink TCI state, or a legacy single-channel uplink spatial relation.

Aspect 39: The method of any of Aspects 21 through 38, wherein one or more applied TCI states according to the MAC-CE based implicit TCI update rule are overwritten by one or more TCI states later selected by a TCI-updating downlink control information.

Aspect 40: The method of any of Aspects 21 through 39, wherein one or more applied TCI states according to the MAC-CE based implicit TCI update rule cannot be overwritten by one or more TCI states later selected by a TCI-updating downlink control information.

Aspect 41: An apparatus for wireless communication at a device, comprising a processor; memory coupled with the processor; and instructions stored in the memory and executable by the processor to cause the apparatus to perform the method of one or more of Aspects 1-20.

Aspect 42: A device for wireless communication, comprising a memory and one or more processors coupled to the memory, the memory and the one or more processors configured to perform the method of one or more of Aspects 1-20.

Aspect 43: An apparatus for wireless communication, comprising at least one means for performing the method of one or more of Aspects 1-20.

Aspect 44: A non-transitory computer-readable medium storing code for wireless communication, the code comprising instructions executable by a processor to perform the method of one or more of Aspects 1-20.

Aspect 45: A non-transitory computer-readable medium storing a set of instructions for wireless communication, the set of instructions comprising one or more instructions that, when executed by one or more processors of a device, cause the device to perform the method of one or more of Aspects 1-20.

Aspect 46: An apparatus for wireless communication at a device, comprising a processor; memory coupled with the processor; and instructions stored in the memory and executable by the processor to cause the apparatus to perform the method of one or more of Aspects 21-40.

Aspect 47: A device for wireless communication, comprising a memory and one or more processors coupled to the memory, the memory and the one or more processors configured to perform the method of one or more of Aspects 21-40.

Aspect 48: An apparatus for wireless communication, comprising at least one means for performing the method of one or more of Aspects 21-40.

Aspect 49: A non-transitory computer-readable medium storing code for wireless communication, the code comprising instructions executable by a processor to perform the method of one or more of Aspects 21-40.

Aspect 50: A non-transitory computer-readable medium storing a set of instructions for wireless communication, the set of instructions comprising one or more instructions that, when executed by one or more processors of a device, cause the device to perform the method of one or more of Aspects 21-40.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors, coupled to the one or more memories, and configured to:

receive an indication that indicates whether a medium access control control element (MAC-CE)-based implicit transmission configuration indicator (TCI) update rule is enabled; and receive a MAC-CE that activates one or more TCI codepoints based at least in part on the indication, wherein one or more applied TCI states according to the MAC-CE based implicit TCI update rule can be overwritten or cannot be overwritten by one or more TCI states later selected by a TCI-updating downlink control information.

2. The UE of claim 1, wherein the MAC-CE that activates the one or more TCI codepoints is based at least in part on the MAC-CE based implicit TCI update rule when the indication indicates that the MAC-CE based implicit TCI update rule is enabled.

3. The UE of claim 1, wherein the MAC-CE that activates the one or more TCI codepoints is based at least in part on a MAC-CE based TCI activation rule when the indication indicates that the MAC-CE based implicit TCI update rule is not enabled.

4. The UE of claim 3, wherein the MAC-CE based TCI activation rule is associated with applying a TCI state to a set of channels or reference signals associated with a TCI codepoint, after a MAC-CE activation time, when a MAC-CE activates the TCI codepoint mapped to the TCI state.

5. The UE of claim 1, wherein one or more predetermined activated TCI codepoints are applied to one or more predetermined sets of channels or reference signals when the MAC-CE based implicit TCI update rule is enabled.

6. The UE of claim 1, wherein the one or more processors, to receive the indication, are configured to receive the indication via a radio resource control flag or an indicator in a MAC-CE that is used for TCI activation.

7. The UE of claim 1, wherein the one or more processors, to receive the indication, are configured to receive the indication via an indicator in downlink control information (DCI), wherein the DCI is associated with a TCI update that includes or does not include a downlink/uplink transmission, or wherein the DCI is not associated with the TCI update and is used for scheduling the downlink/uplink transmission.

8. The UE of claim 1, wherein the MAC-CE based implicit TCI update rule is associated with applying one predetermined activated TCI codepoint to a plurality of channels or reference signals.

9. The UE of claim 1, wherein the MAC-CE based implicit TCI update rule is associated with applying multiple predetermined activated TCI codepoints to multiple predetermined sets of channels or reference signals.

10. The UE of claim 1, wherein the MAC-CE based implicit TCI update rule is associated with applying multiple TCI states mapped to a predetermined activated TCI codepoint to multiple predetermined sets of channels or reference signals.

11. The UE of claim 1, wherein the MAC-CE based implicit TCI update rule is associated with applying multiple TCI states mapped to a predetermined activated TCI codepoint to multiple TCI states originally configured or indicated for a channel or reference signal.

12. The UE of claim 1, wherein the indication instructs the UE to use the MAC-CE based implicit TCI update rule or a MAC-CE based TCI activation rule, and wherein the indication is signaled via radio resource control signaling, a MAC-CE, or downlink control information.

13. The UE of claim 1, wherein one or more predetermined activated TCI codepoints associated with the MAC- CE based implicit TCI update rule are determined based at least in part on TCI codepoints mapped to a quantity of TCI states.

14. The UE of claim 1, wherein one or more predetermined activated TCI codepoints associated with the MAC-CE based implicit TCI update rule are mapped to a quantity of TCI states.

15. The UE of claim 1, wherein an applied channel or reference signal associated with the MAC-CE based implicit TCI update rule includes one or more of a physical downlink control channel, a physical downlink shared channel, a channel state information reference signal, a physical uplink control channel, a physical uplink shared channel, or a sounding reference signal, and wherein the applied channel or reference signal is based at least in part on originally configured or indicated channels or reference signals with a quantity of TCI states.

16. The UE of claim 1, wherein an activated TCI state associated with the MAC-CE based implicit TCI update rule includes one or more of a joint downlink/uplink TCI state, a separate downlink common TCI state, a separate uplink common TCI state, a legacy single-channel downlink TCI state, or a legacy single-channel uplink spatial relation.

17. The UE of claim 1, wherein the one or more applied TCI states according to the MAC-CE based implicit TCI update rule can be overwritten by the one or more TCI states later selected by the TCI-updating downlink control information.

18. The UE of claim 1, wherein the one or more applied TCI states according to the MAC-CE based implicit TCI update rule cannot be overwritten by the one or more TCI states later selected by the TCI-updating downlink control information.

19. A user equipment (UE) for wireless communication, comprising:

one or more memories; and one or more processors, coupled to the one or more memories, and configured to:

receive an indication that indicates whether a medium access control control element (MAC-CE)-based implicit transmission configuration indicator (TCI) update rule is enabled; and receive a MAC-CE that activates one or more TCI codepoints based at least in part on the indication, wherein the MAC-CE based implicit TCI update rule is associated with applying a first activated TCI codepoint to a plurality of channels or reference signals to prevent a transmission of additional downlink control information.

20. A method of wireless communication performed by a user equipment (UE), comprising:

receiving an indication that indicates whether a medium access control control element (MAC-CE)-based implicit transmission configuration indicator (TCI) update rule is enabled; and receiving a MAC-CE that activates one or more TCI codepoints based at least in part on the indication wherein the MAC-CE based implicit TCI update rule is associated with applying a first activated TCI codepoint to a plurality of channels or reference signals to prevent a transmission of additional downlink control information.

21. A method of wireless communication performed by a user equipment (UE), comprising:

receiving an indication that indicates whether a medium access control control element (MAC-CE)-based implicit transmission configuration indicator (TCI) update rule is enabled; and receiving a MAC-CE that activates one or more TCI codepoints based at least in part on the indication, wherein one or more applied TCI states according to the MAC-CE based implicit TCI update rule are overwritten or cannot be overwritten by one or more TCI states later selected by a TCI-updating downlink control information.

22. The method of claim 21, wherein the one or more applied TCI states according to the MAC-CE based implicit TCI update rule are overwritten by the one or more TCI states later selected by the TCI-updating downlink control information.

23. The method of claim 21, wherein the one or more applied TCI states according to the MAC-CE based implicit TCI update rule cannot be overwritten by the one or more TCI states later selected by the TCI-updating downlink control information.

* * * * *